(12) United States Patent
Muto

(10) Patent No.: US 10,581,304 B2
(45) Date of Patent: Mar. 3, 2020

(54) STATOR MANUFACTURING APPARATUS AND STATOR MANUFACTURING METHOD

(71) Applicant: NITTOKU ENGINEERING CO., LTD., Saitama-shi, Saitama (JP)

(72) Inventor: Kenichi Muto, Fukushima (JP)

(73) Assignee: NITTOKU CO., LTD., Saitama, Saitama (JP)

( * ) Notice: Subject to any disclaimer, the term of this patent is extended or adjusted under 35 U.S.C. 154(b) by 339 days.

(21) Appl. No.: 15/542,248

(22) PCT Filed: Feb. 29, 2016

(86) PCT No.: PCT/JP2016/056085
§ 371 (c)(1),
(2) Date: Jul. 7, 2017

(87) PCT Pub. No.: WO2016/140194
PCT Pub. Date: Sep. 9, 2016

(65) Prior Publication Data
US 2017/0373570 A1    Dec. 28, 2017

(30) Foreign Application Priority Data

Mar. 2, 2015 (JP) ................................. 2015-039903

(51) Int. Cl.
*H02K 3/04* (2006.01)
*H02K 15/085* (2006.01)
*H02K 15/00* (2006.01)

(52) U.S. Cl.
CPC ............. *H02K 15/085* (2013.01); *H02K 3/04* (2013.01); *H02K 15/0031* (2013.01)

(58) Field of Classification Search
CPC ............................... H02K 15/085; H02K 3/04
USPC ......................................................... 310/254.1
See application file for complete search history.

(56) References Cited

U.S. PATENT DOCUMENTS

| | | | |
|---|---|---|---|
| 7,225,525 B2 * | 6/2007 | Yamamoto | H02K 15/022 264/272.2 |
| 2004/0143956 A1 * | 7/2004 | Haller | H02K 3/487 29/596 |
| 2007/0143983 A1 * | 6/2007 | Yamaguchi | H02K 15/005 29/596 |

(Continued)

FOREIGN PATENT DOCUMENTS

| | | |
|---|---|---|
| JP | 2005-218164 A | 8/2005 |
| JP | 2007-166849 A | 6/2007 |

(Continued)

*Primary Examiner* — Alexander Talpalatski
(74) *Attorney, Agent, or Firm* — Rabin & Berdo, P.C.

(57) ABSTRACT

A stator manufacturing apparatus includes an insertion tool that is insertable into a stator core and being configured to dispose a pair of side parts of a stator coil in two holding grooves. A pressing tool has plate-like pushers arranged to correspond to the positions of the holding grooves. The pressing tool pushes out the side parts of the stator coils and inserts the side parts into the corresponding slots. A pair of shaping tools face coil end parts of the stator coils. A plurality of slits through which the pushers are insertable are provided in a principal surface of each shaping tool. A shaping tool moving unit shapes the coil end parts by pressing the pair of shaping tools in an axial direction with the pushers inserted in each of the corresponding holding grooves.

6 Claims, 13 Drawing Sheets

(56) References Cited

U.S. PATENT DOCUMENTS

2007/0261229 A1* 11/2007 Yamaguchi .......... H02K 15/066
                                                    29/596
2013/0000105 A1*  1/2013 Hasegawa .......... H02K 15/0428
                                                    29/596
2017/0373570 A1* 12/2017 Muto .................. H02K 15/085

FOREIGN PATENT DOCUMENTS

| JP | 2007-166850 A | 6/2007 |
| JP | 2011-193597 A | 9/2011 |
| JP | 2011-229285 A | 11/2011 |

* cited by examiner

STATOR MANUFACTURING APPARATUS AND STATOR MANUFACTURING METHOD

TECHNICAL FIELD

The present invention relates to a stator manufacturing apparatus and a stator manufacturing method in a rotating electric machine such as a three-phase AC generator. More specifically, the present invention relates to a stator manufacturing apparatus and a stator manufacturing method for manufacturing a stator by inserting stator coils fabricated in advance into slots of a stator core.

BACKGROUND ART

Conventionally, a stator of a rotating electric machine includes a cylindrical stator core and stator coils. The cylindrical stator core has a plurality of teeth (magnetic poles) that are radially arranged side by side and project in a radially inward direction and a plurality of slots that open between the teeth. The stator coils are assembled with the stator core by accommodating coil side parts into those slots. A method for fabricating stator coils in advance separately from a stator core and assembling the stator coils with each of the slots of the stator core is known as a stator coil assembling method.

For example, the following method has been proposed as a stator manufacturing method (see, for example, JP2007-166850A and JP2011-229285A). The method uses an insertion tool in which a plurality of holding grooves corresponding to slots of a stator core are formed on an outer periphery so that a pair of side parts of each of a plurality of coils wound in advance are successively inserted into two holding grooves separated by a predetermined width. The method also arranges the plurality of coils along the outer periphery of the insertion tool and inserts the insertion tool that the plurality of coils wound thereon into the inner periphery of the stator core so that each holding groove is positioned to be aligned with the corresponding slot of the stator core. Subsequently, the method inserts a plurality of plate-like pushers that narrow in width toward the tips into the corresponding holding grooves from the tips of the plate-like pushers. The method also pushes out the pair of side parts of each coil inserted into the holding grooves toward a radially outer side and inserts the side parts into the corresponding slots of the stator core.

In this stator manufacturing method, the side parts of the coils wound on the insertion tool are pushed out toward the radially outer side and inserted into the slots. Thus, it is possible to reduce damage to wire materials constituting the coils by preventing considerable deformation of the coils. Here, in the stator coil inserted into each slot of the stator core, parts accommodated into the slots serve as coil side parts and remaining coil parts projecting from end surfaces of the stator core without being inserted into the slots serve as coil end parts.

SUMMARY OF INVENTION

However, in the above stator manufacturing method for pushing out the pair of side parts of the coil toward the radially outer side and inserting the side parts into the slots, the pair of side parts are inserted into the slots while the coil is deformed to expand a spacing between one side part and the other side part thereof when the coil is pushed out toward the radially outer side. Thus, if the pushers having moved the pairs of side parts radially outwardly of the stator core are removed from the holding grooves after the pairs of side parts are inserted into the slots, there has been a problem that a part or all of the side parts inserted into the slots pop out toward a radially inner side from those slots due to so-called springback of the deformed coils to slightly return to an initial shape.

Further, in the above stator manufacturing method, if the pair of side parts of the coil are inserted into the slots, the spacing between the two side parts is expanded. Accordingly, parts corresponding to the coil end parts are deformed before and after the pair of side parts are inserted into the slots. Thus, the parts corresponding to the coil end parts are formed into a chevron shape so as to be easily deformable. In this case, even if the pair of side parts of the coil are inserted into the slots, the coil end parts having that chevron shape are retained in the chevron shape and the coil end parts relatively largely project from end parts of the stator core in some cases. If the coil end parts of the stator project in an axial direction in this way, there has been also a problem of enlarging the stator.

The present invention has developed in view of the aforementioned problems and aims to provide a stator manufacturing apparatus and a stator manufacturing method capable of reducing heights of coil end parts of stator coils projecting from end edges of a stator core while preventing side parts of the stator coils inserted into slots from popping out of the slots.

According to one aspect of the present invention, a stator manufacturing apparatus includes an insertion tool, a pressing tool, a pair of shaping tools, and a shaping tool moving unit. The insertion tool is configured to be insertable into a stator core, has a plurality of slit-like holding grooves formed on an outer periphery in correspondence with a plurality of slots, and is configured such that a pair of side parts of a stator coil are disposed in two of the holding grooves separated by a predetermined width. The pressing tool includes a plurality of plate-like pushers narrowed in width toward tips and arranged to correspond to the positions of the plurality of holding grooves of the insertion tool, and is configured to push out the side parts of the stator coils toward a radially outer side and insert the side parts into the corresponding slots by inserting the pushers into the corresponding holding grooves with the tips in the lead in a state where the stator coils are disposed on the insertion tool. The pair of shaping tools are provided to face coil end parts of a plurality of the stator coils having the pairs of side parts inserted in the plurality of slots. The coil end parts project from end edges of the stator core. The shaping tool moving unit is configured to shape the coil end parts by pressing the pair of shaping tools in an axial direction against the coil end parts with the pushers inserted in each of the corresponding holding grooves.

According to another aspect of the present invention, a stator manufacturing method of the present invention for manufacturing a stator by inserting pairs of side parts of a plurality of stator coils wound in advance into corresponding slots of a stator core includes preparing an insertion tool having a plurality of slit-like holding grooves formed on an outer periphery so as to correspond to a plurality of the slots of the stator core, disposing the pair of side parts of each of the plurality of stator coils wound in advance into two of the holding grooves separated by a predetermined width, positioning the insertion tool such that the holding grooves are aligned with the corresponding slots of the stator core by inserting the insertion tool into an inner periphery of the stator core, pushing out the side parts of the stator coils toward a radially outer side and inserting the side parts into the corresponding slots of the stator core by inserting a plurality of plate-like pushers narrowed in width toward tips into the plurality of corresponding holding grooves with the tips in the lead, and shaping coil end parts by pressing a shaping tool in an axial direction against the coil end parts of the plurality of stator coils projecting from end edges of the stator core with the plurality of pushers inserted in the corresponding holding grooves.

DESCRIPTION OF EMBODIMENTS

Hereinafter, one embodiment of the present invention is described with reference to the accompanying drawings.

Figure 1:
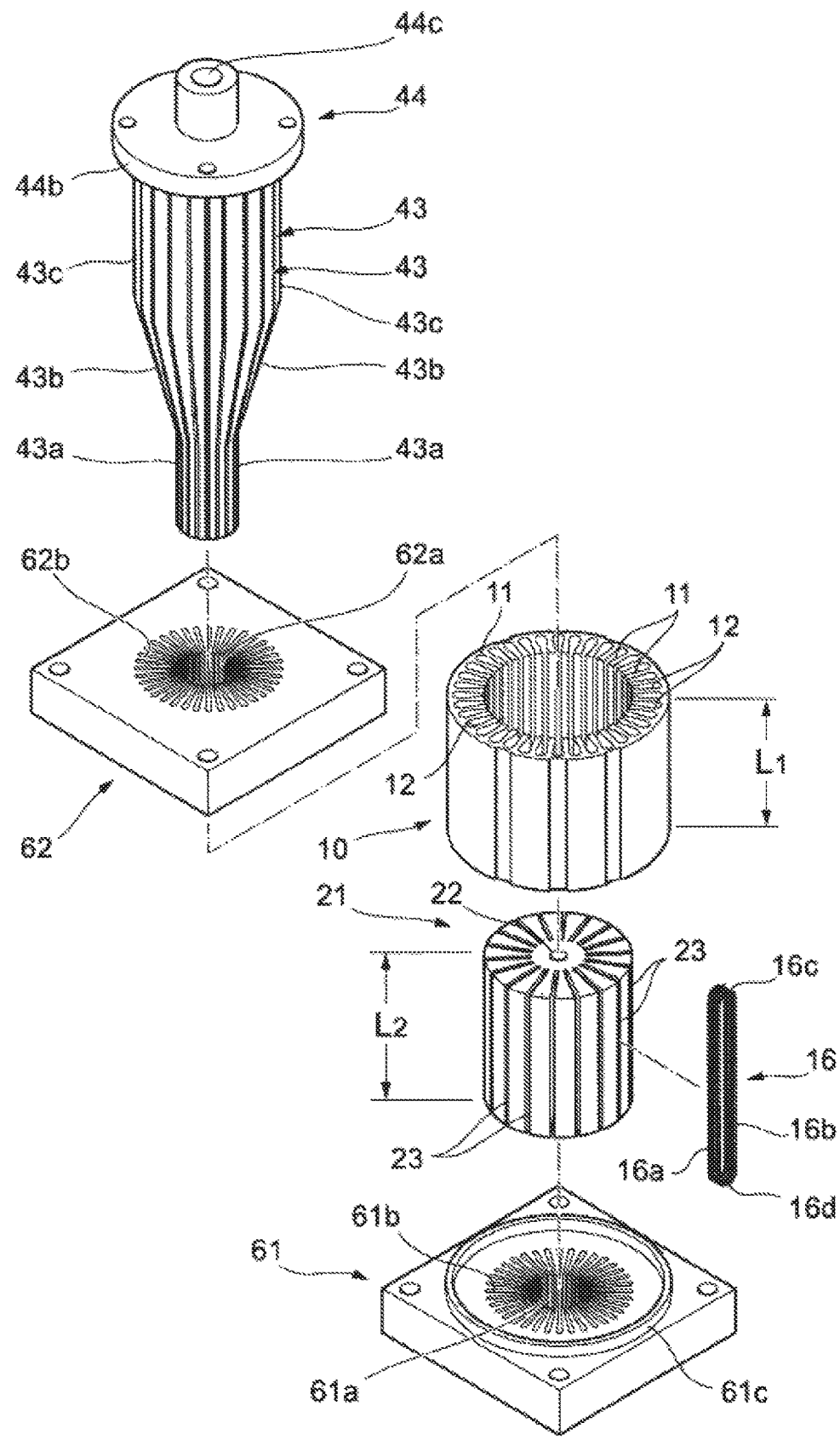
FIG. 1 is a perspective view showing main constituent elements of a stator manufacturing apparatus in one embodiment of the present invention.
Figure 8:
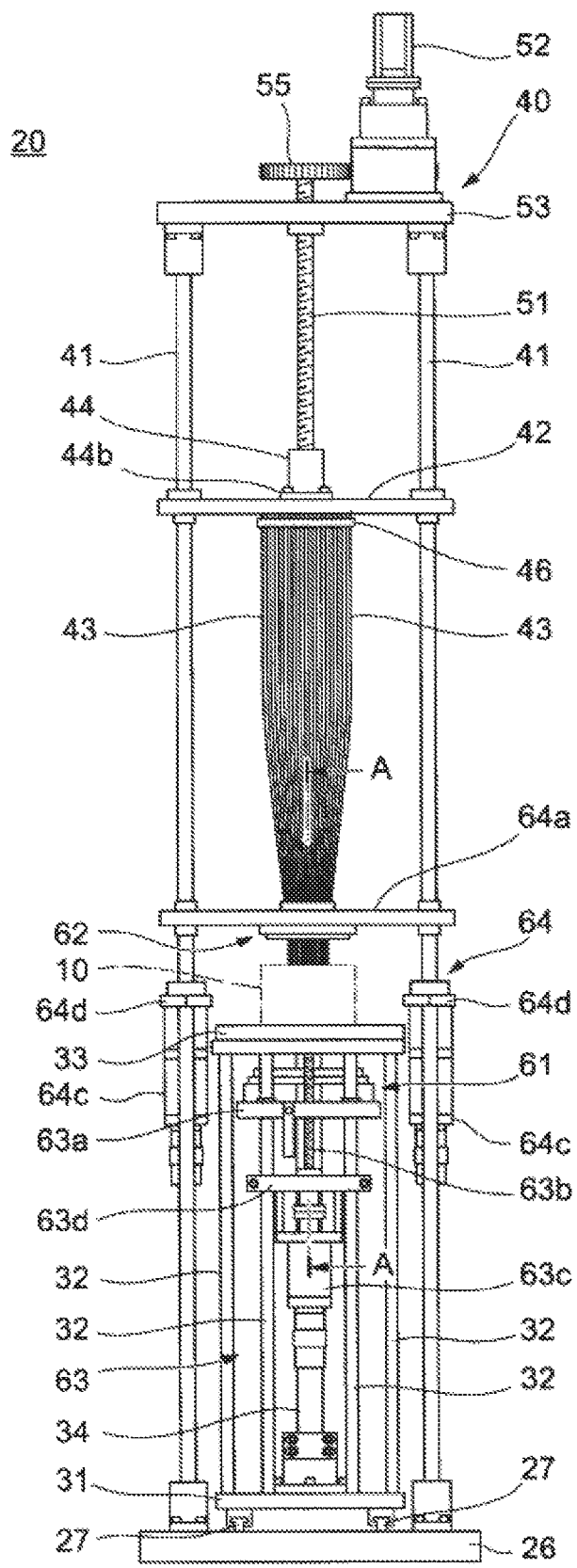
FIG. 8 is a front view of the stator manufacturing apparatus of the present embodiment.
Figure 9:
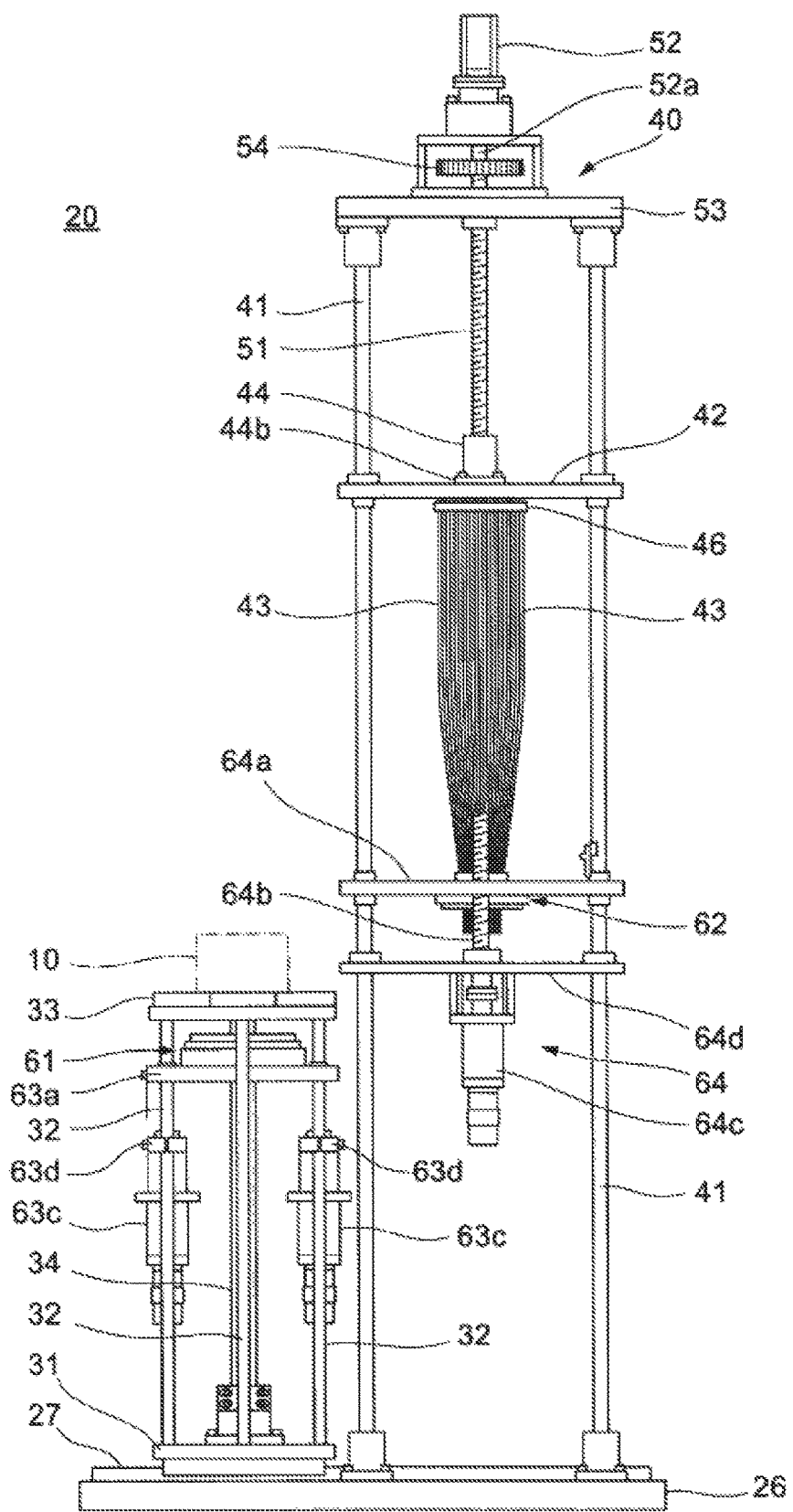
FIG. 9 is a side view of the stator manufacturing apparatus of the present embodiment.

FIG. 1 is a perspective view showing main constituent elements of a stator manufacturing apparatus 20 in one embodiment of the present invention. FIG. 8 is a front view of the stator manufacturing apparatus 20 of the present embodiment. FIG. 9 is a side view of the stator manufacturing apparatus 20 of the present embodiment.

The stator manufacturing apparatus 20 of the present embodiment includes a pressing tool 40, an upper shaping tool 62 and a lower shaping tool 61, an upper shaping tool moving unit 64 and a lower shaping tool moving unit 63 (see FIGS. 8 and 9), and an insertion tool 21.

As shown in FIG. 1, the stator manufacturing apparatus 20 is a apparatus for manufacturing a stator by winding coils 16 on a stator core 10 including a plurality of teeth (magnetic poles) 11 radially arranged and projecting in a radially inward direction and a plurality of slots 12 open between the teeth.

It should be noted that the coils 16 before being mounted on the stator core 10 are also referred to as "stator coils 16" for the sake of convenience in the following description.

Figure 7:
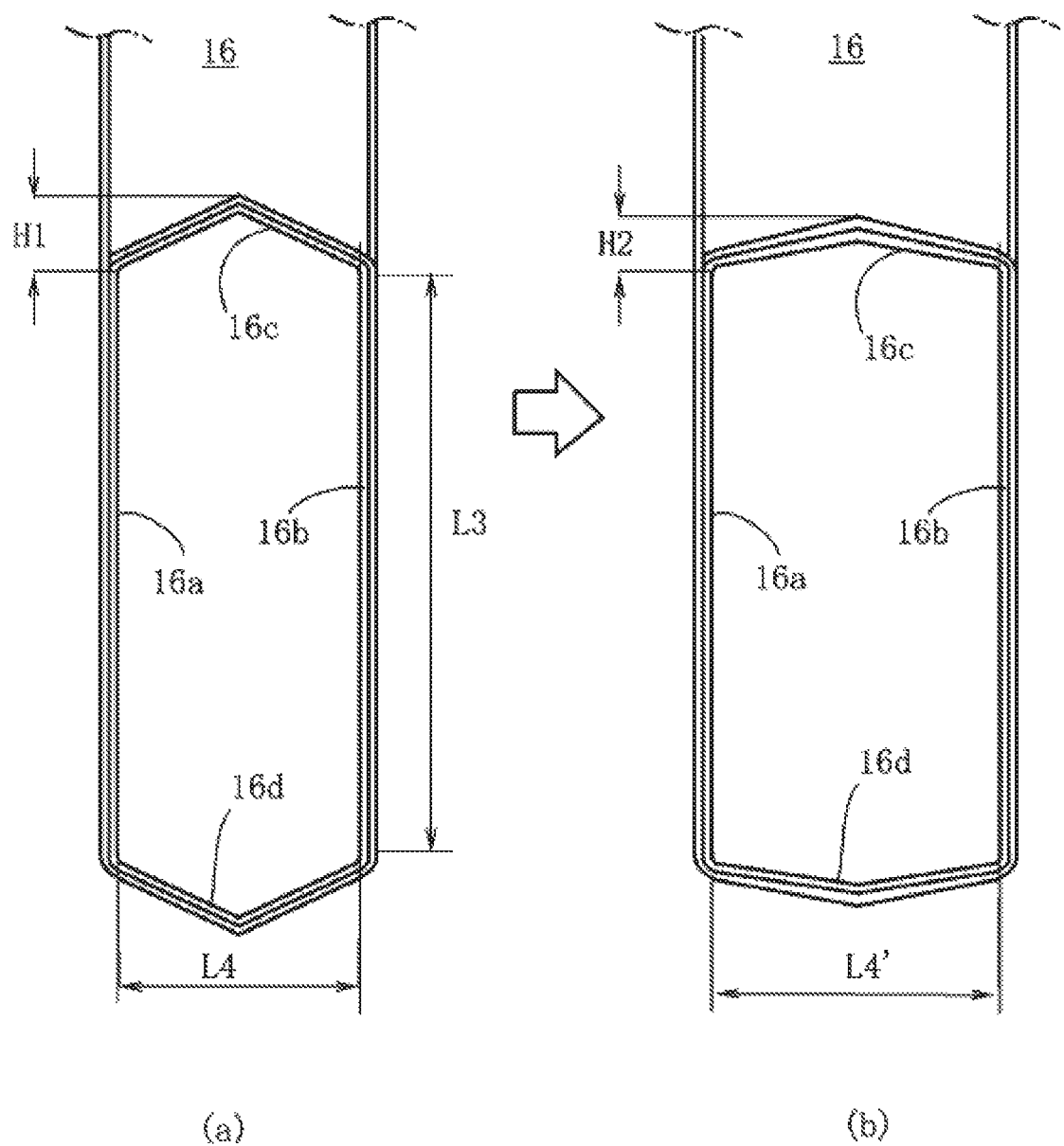
FIG. 7 is a view showing the shape of the stator coil to be inserted into the slots of a stator core.

As shown in FIGS. 1, 8 and 9, the stator manufacturing apparatus 20 of the present embodiment is a apparatus for manufacturing a stator 9 (see FIGS. 10 and 11) composed of the stator core 10 and a plurality of stator coils 16 by respectively inserting both side parts 16a, 16b of the plurality of stator coils 16 wound in advance as shown in FIG. 7 into the corresponding slots 12 of the stator core 10.

The stator manufacturing apparatus 20 includes the insertion tool 21 to be inserted into the inner periphery of the stator core 10 to mount the stator coils 16. The insertion tool 21 has an entire length L2 substantially equal to an entire length (length in an extending direction of the slots 12) L1 of the stator core 10. As shown in FIG. 1, the insertion tool 21 has a substantially cylindrical shape as a whole. This cylindrical insertion tool 21 is formed with a through hole 22 whose center is positioned on a center axis of the cylindrical insertion tool 21 at a center position of the upper end surface. Further, on an outer peripheral side surface of the insertion tool 21, a plurality of holding grooves 23 are radially formed when viewed from a center line passing through a center of the upper end surface.

The insertion tool 21 is configured to be insertable into the stator core 10. Further, the insertion tool 21 has the plurality of slit-like holding grooves 23 formed on an outer periphery so as to correspond to the plurality of slots 12 of the stator core 10. The insertion tool 21 is configured such that the pairs of the side parts 16a, 16b of the stator coil 16 are disposed in two holding grooves (23) separated by a predetermined width.

The holding grooves 23 are formed at the same intervals as the slots 12 of the stator core 10 so as to correspond to the positions of the slots 12 of the stator core 10. Specifically, as many holding grooves 23 as the slots 12 are formed on the outer periphery of the insertion tool 21. The holding grooves 23 are provided radially toward the outer periphery of the insertion tool 21 and formed over the entire longitudinal length of the insertion tool 21.

FIG. 7 is a view showing the shape of the stator coil 16 to be inserted into the slots 12 of the stator core 10. As shown in FIGS. 1 and 7, the stator coil 16 to be mounted on the stator core 10 is manufactured by winding a wire material. The stator coil 16 has a pair of side parts 16a, 16b extending in the extending direction of the slots 12 to be inserted into the slots 12 of the stator core 10. Further, the stator coil 16 includes a pair of coil end parts 16c, 16d coupling end edges of the both side parts 16a, 16b and axially projecting from upper and lower end edges of the stator core 10. In the present embodiment, one side part 16a and the other side part 16b constituting the both side parts are configured to be insertable into the holding grooves 23 of the insertion tool 21.

Specifically, the both side parts 16a, 16b are formed such that a length L3 (see FIG. 7) in an axial direction (longitudinal direction) of the both side parts 16a, 16b are slightly longer than the entire length L1 (see FIG. 1) of the stator core 10. Further, the both side parts 16a, 16b are formed such that a length L4 (see FIG. 7) of the coil end parts 16c, 16d are slightly longer than a length between two slots 12 into which the both side parts 16a, 16b are to be inserted. The coil end parts 16c, 16d coupling the end edges of the pair of both side parts 16a, 16b are wound to have a chevron shape as shown in FIG. 7.

Figure 5:
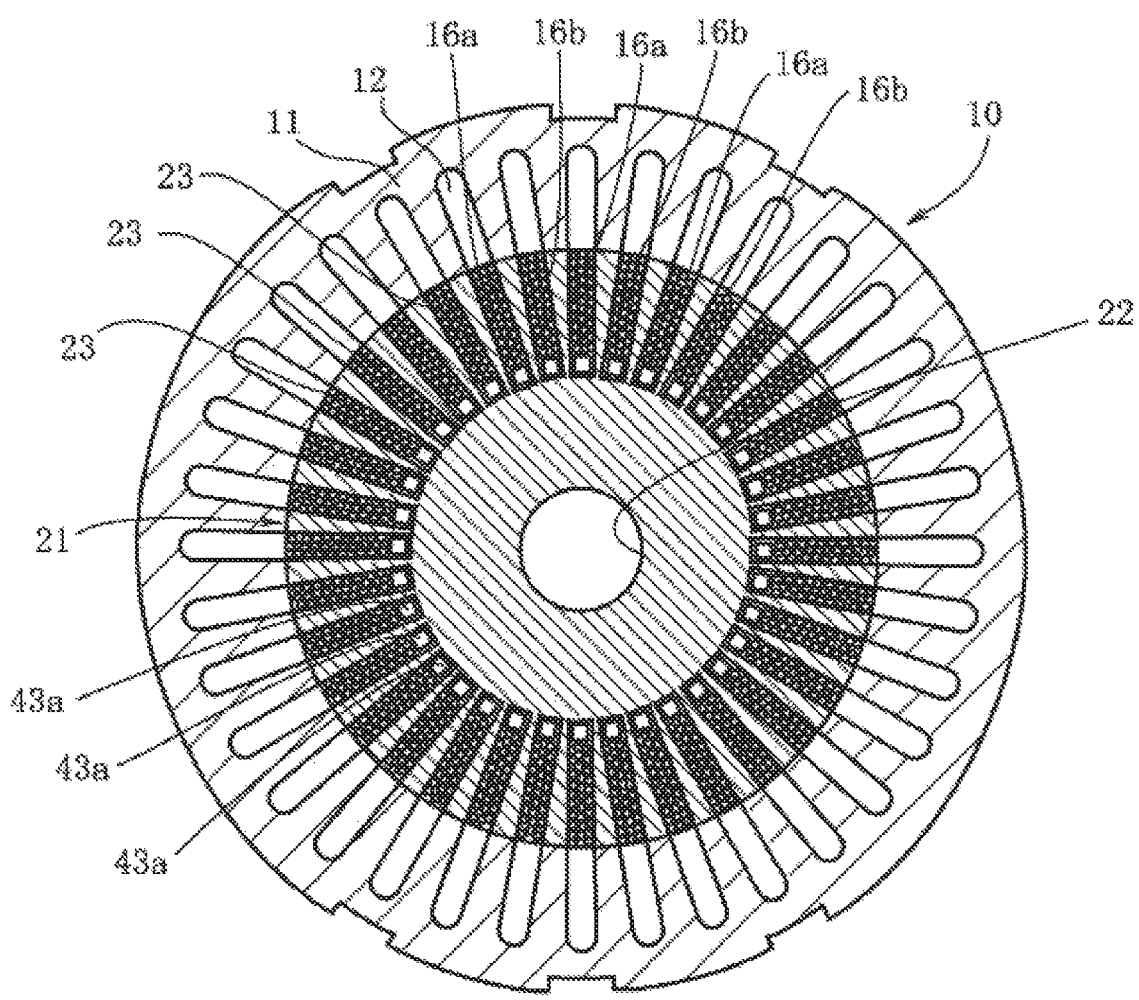
FIG. 5 is a sectional view taken along line B-B of FIG. 2 showing a state where narrow parts of the pushers of the pressing tool are inserted in each of the corresponding holding grooves.
Figure 6:
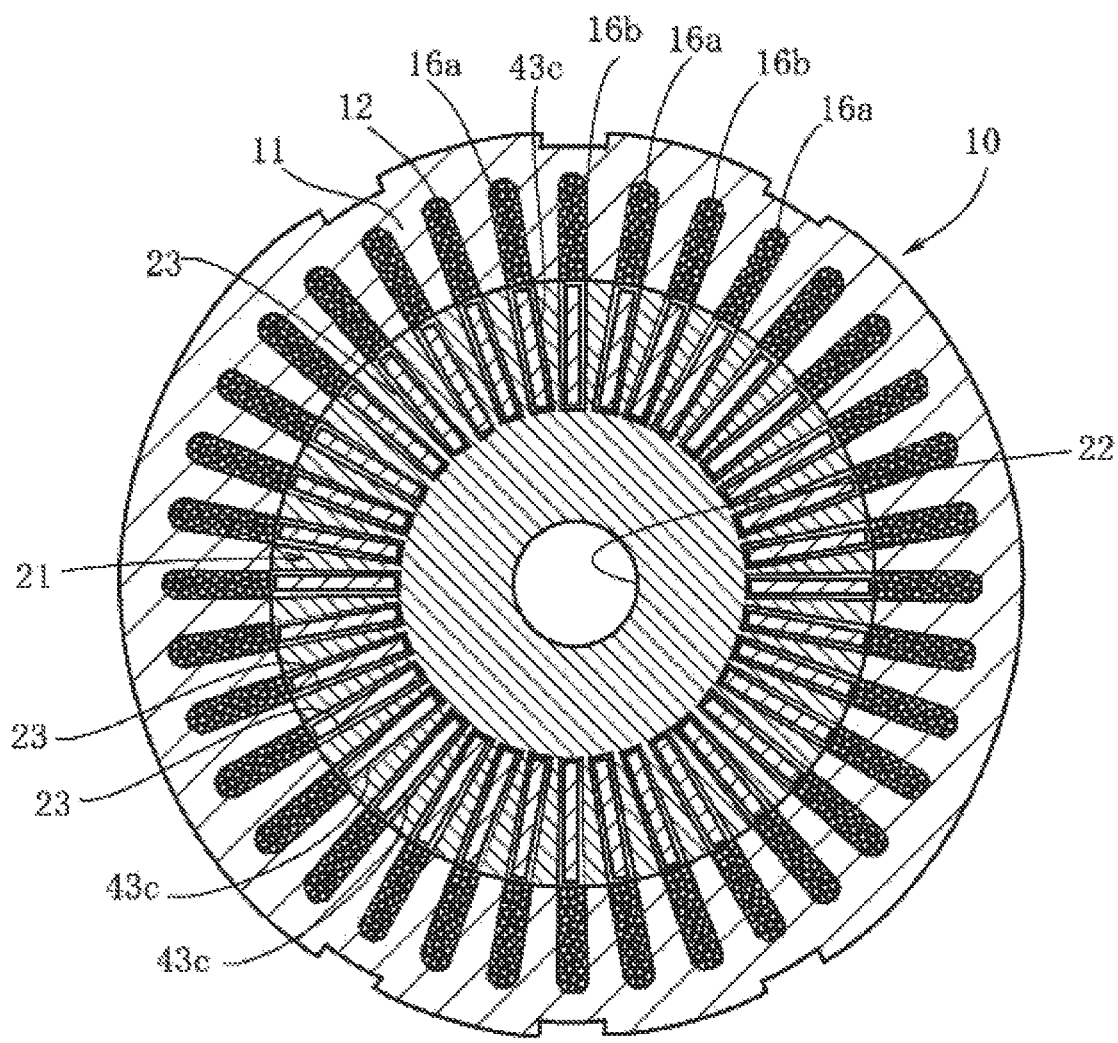
FIG. 6 is a sectional view taken along line C-C of FIG. 3 showing the state where the stator coils inserted in the holding grooves are pushed out toward the radially outer side and inserted into the corresponding slots.

As shown in FIG. 1, the holding grooves 23 are formed to extend in the axial direction on the outer periphery of the insertion tool 21. The holding grooves 23 are formed to have at least such a depth that the side parts 16a, 16b of the stator coils 16 can be accommodated therein. As shown in FIG. 5, a plurality of stator coils 16 fabricated in advance are arranged along a circumference of the insertion tool 21. It should be noted that FIG. 6 is a sectional view taken along line C-C of FIG. 3 showing a state where the stator coils 16 inserted in the holding grooves 23 are pushed out toward a radially outer side and inserted into the corresponding slots 12.

As shown in FIGS. 8 and 9, the stator manufacturing apparatus 20 of the present embodiment includes a first pedestal 33 supported on a movable table 31 via a plurality of support columns 32 and supporting the stator core 10 such that an axial center extends in a vertical direction, and a second pedestal 34 standing on the movable table 31 and supporting the insertion tool 21 inserted inside the stator core 10 placed on the first pedestal 33.

Figure 2:
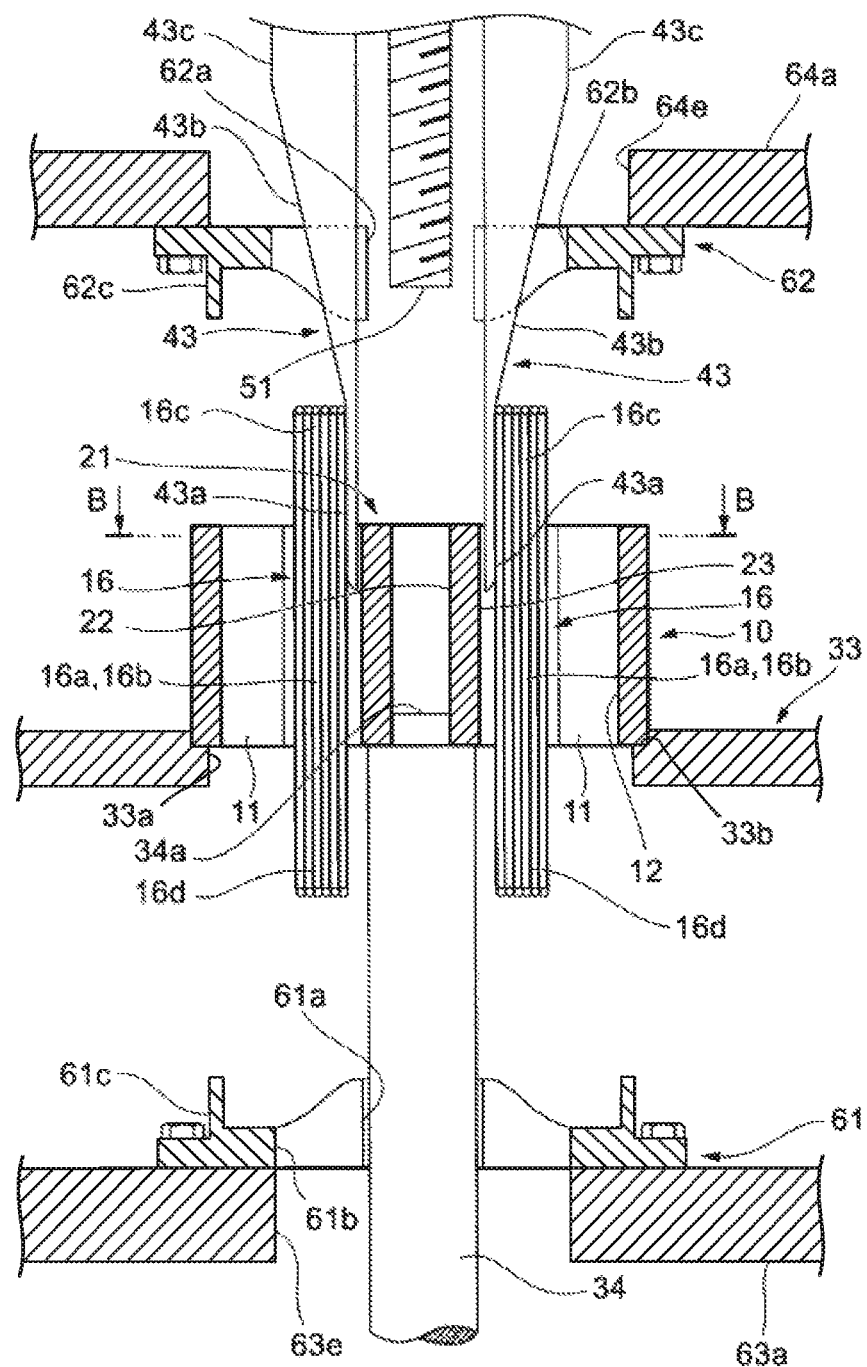
FIG. 2 is a sectional view taken along line A-A of FIG. 8 showing a state of inserting pushers of a pressing tool into each of the corresponding holding grooves with tips in the lead.

FIG. 2 is a sectional view taken along line A-A of FIG. 8 showing a state of inserting pushers 43 of the pressing tool 40 into each of the corresponding holding grooves 23 with tips in the lead. FIG. 3 is a sectional view corresponding to FIG. 2, showing a state where the stator coils 16 inserted in the holding grooves 23 are pushed out toward the radially outer side and inserted into the corresponding slots 12. FIG. 4 is a sectional view corresponding to FIG. 3, showing a state where shaping tools are pressed against the coil end parts 16c, 16d of the stator coils 16 for shaping.

Figure 3:
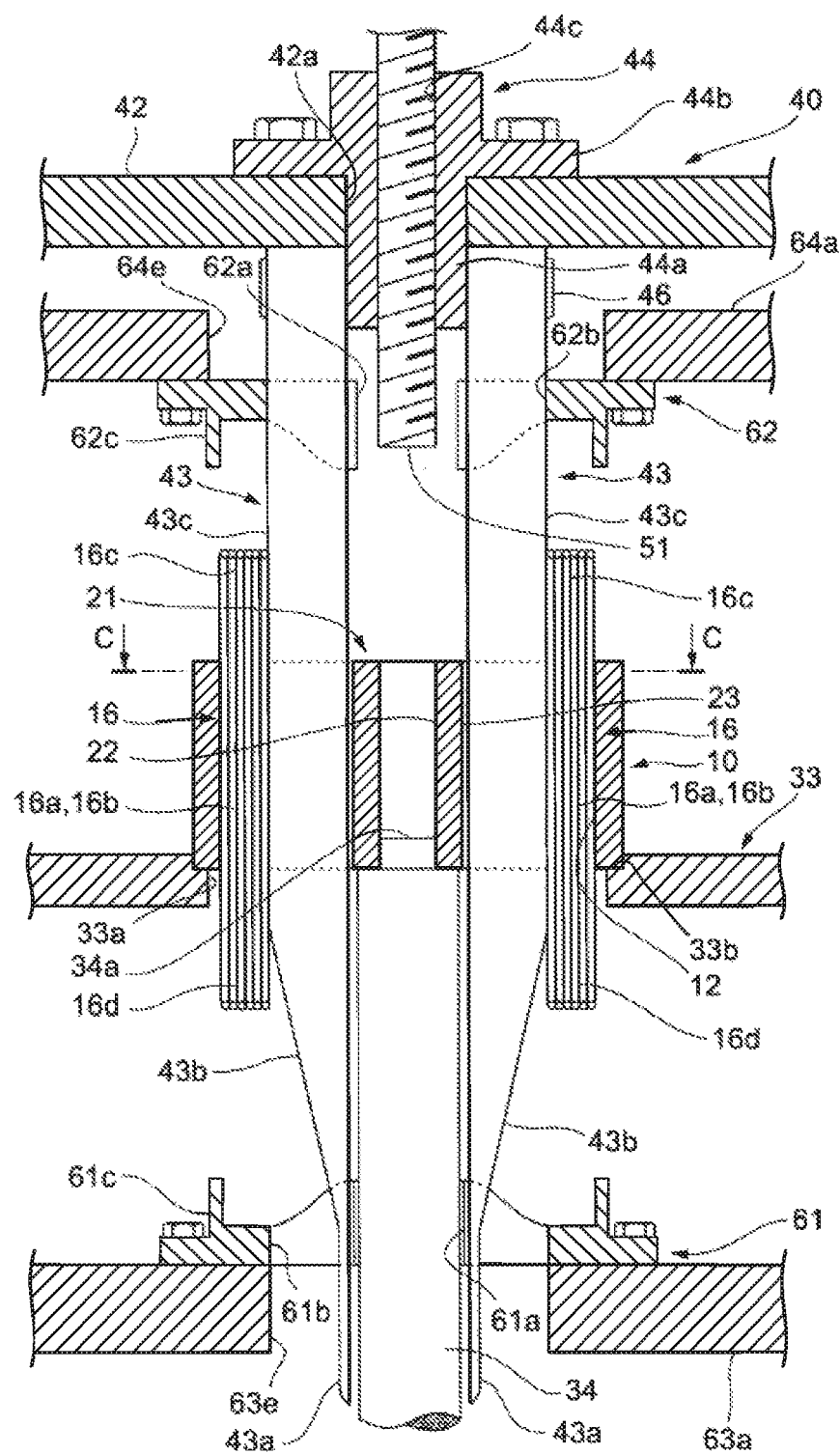
FIG. 3 is a sectional view corresponding to FIG. 2, showing a state where stator coils inserted in the holding grooves are pushed out toward a radially outer side and inserted into the corresponding slots.
Figure 4:
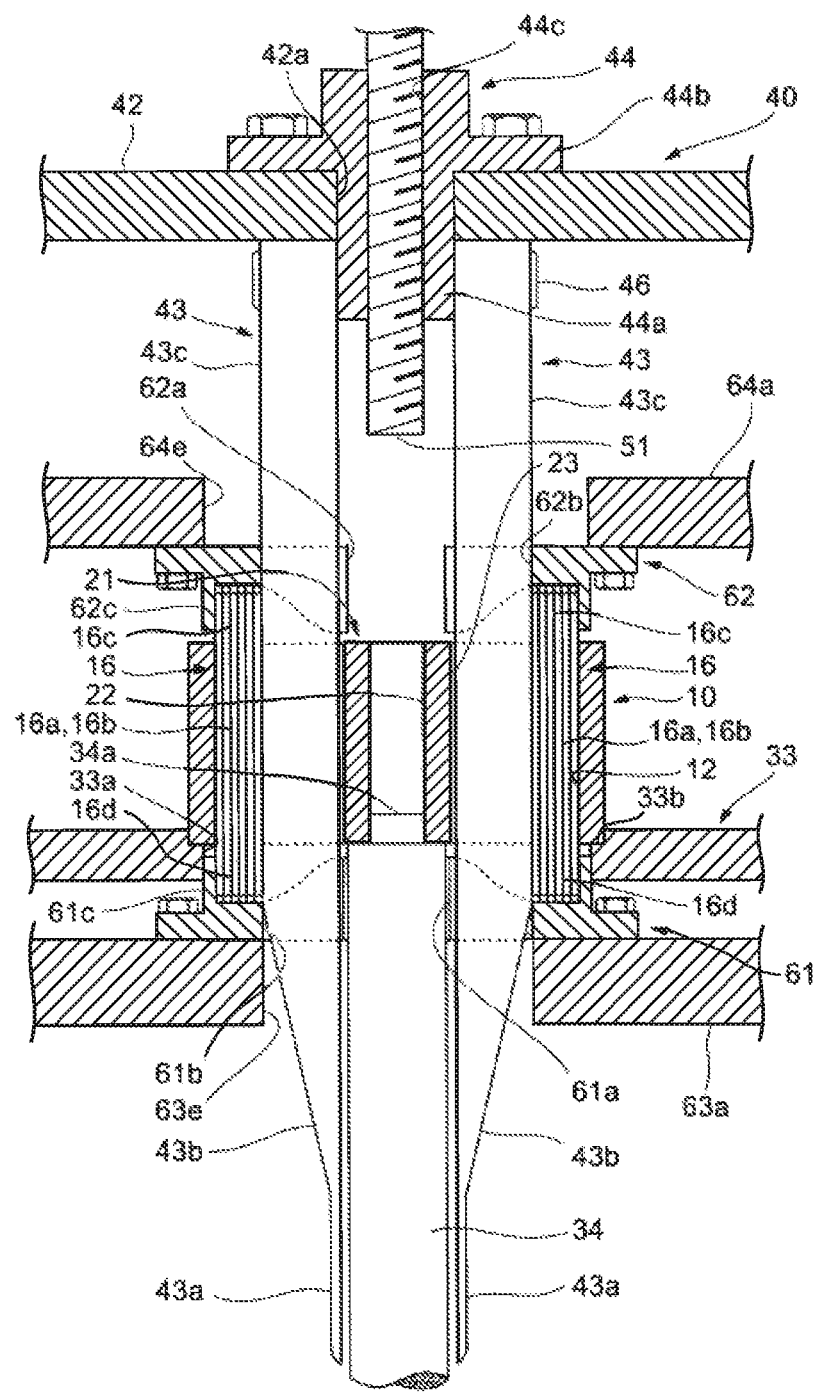
FIG. 4 is a sectional view corresponding to FIG. 3, showing a state where shaping tools are pressed against coil end parts of the stator coils for shaping.

As shown in FIGS. 2 to 4, the first pedestal 33 has a horizontal flat plate shape. A circular hole 33a having a diameter smaller than an outer diameter of the stator core 10 and larger than a diameter of a virtual circle circumscribing the slots 12 is formed in a center of the first pedestal 33. Further, a cutout 33b on which the periphery of the lower surface of the stator core 10 whose center axis extends in the vertical direction is to be seated is formed over the entire circumference on a hole edge of the circular hole 33a on the upper surface of the first pedestal 33. The first pedestal 33 is configured to support the stator core 10 by seating the periphery of the lower surface of the stator core 10 on the cut out 33b.

The second pedestal 34 is a round bar standing on the movable table 31 such that a center axis thereof coincides with that of the circular hole 33a. The second pedestal 34 has such a cylindrical shape as to support a central part of the lower surface of the insertion tool 21 inserted inside the stator core 10 excluding the holding grooves 23 from below. A boss 34a for positioning insertable into the through hole 22 of the insertion tool 21 is formed in an upper end part of the second pedestal 34.

As described above, the stator manufacturing apparatus 20 of the present embodiment includes the pressing tool 40 pressing the side parts 16a, 16b (see FIG. 7) of the stator coils 16 inserted and held in the holding grooves 23 of the insertion tool 21 into the corresponding slots 12 of the stator core 10.

The pressing tool 40 is used to move the stator coils 16 from the insertion tool 21 toward the stator core 10 side as shown in FIG. 6 from a state shown in FIG. 5 where the stator coils 16 are set in the insertion tool 21 after the insertion tool 21 is arranged inside the stator core 10.

FIG. 5 is a sectional view taken along line B-B of FIG. 2 showing a state where narrow parts of the pushers of the pressing tool are inserted in each of the corresponding holding grooves. FIG. 6 is a sectional view taken along line C-C of FIG. 3 showing the state where the stator coils inserted in the holding grooves are pushed out toward the radially outer side and inserted into the corresponding slots.

As shown in FIGS. 8 and 9, the pressing tool 40 includes an elevating table 42 vertically movably provided on a plurality of support bars 41 standing on a base 26, a plurality of pushers 43 attached to the lower surface of the elevating table 42, and elevation means for raising and lowering the elevating table 42 together with the plurality of pushers 43.

As shown in FIG. 1, each pusher 43 is a plate-like member. As many pushers 43 as the holding grooves 23 of the insertion tool 21 are attached to an internally threaded member 44 while being arranged at the same intervals as the holding grooves 23 in a circumferential direction. As shown in FIG. 3, the internally threaded member 44 includes a hollow cylindrical attached portion 44a to which the plurality of pushers 43 are to be attached and a flange 44b integrally formed to the attached portion 44a and to be mounted on the elevating table 42 by bolts or the like. Further, an internally threaded hole 44c with which a ball screw 51 (see FIG. 8) of the elevation means is threadably engageable is formed to penetrate through a center of the internally threaded member 44.

A through hole 42a through which the attached portion 44a is insertable is formed in a central part of the elevating table 42. The upper ends of the plurality of plate-like pushers 43 are radially attached to the periphery of the attached portion 44a projecting downward from the elevating table 42 by inserting the attached portion 44a of the internally threaded member 44 through the through hole 42a and fastening the flange 44b to the elevating table 42 by screws. In this way, such a number of pushers 43 are attached to the elevating table 42 in such number and at such intervals as to be inserted into all the slots 12 of the stator core 10.

It should be noted that, as shown in FIGS. 2 and 3, the plurality of pushers 43 radially attached to the attached portion 44a are fastened by being surrounded by a band 46.

Each of as many pushers 43 as the slots 12 has the same structure. As shown in FIGS. 2 to 4, a narrow part 43a is formed at a lower part of each pusher 43 and a tapered part 43b having a linear shape or a curved shape with a relatively large curvature to be gradually expanded in width (radial length in a horizontal cross-section) is formed from the narrow part 43a toward the internally threaded member 44. Further, a wide part 43c having a constant width is formed from the upper end of the tapered part 43b to the internally threaded member 44. A width of the wide part 43c is formed to be substantially equal or slightly larger than a depth of the holding groove 23. A length of the wide part 43c is formed to be longer than the axial length L2 (see FIG. 1) of the insertion tool 21.

It should be noted that, for the sake of convenience in illustration, the numbers of the holding grooves 23 of the insertion tool 21 and the pushers 43 are smaller than that of the slots 12 of the stator core 10 and only one stator coil 16 is shown in FIG. 1.

As shown in FIGS. 8 and 9, the elevation means raising and lowering the elevating table 42 together with the plurality of pushers 43 includes the ball screw 51 to be threadably engaged with the internally threaded member 44 and a motor 52 rotating the ball screw 51. The motor 52 is disposed on a fixing table 53 provided on the upper ends of the plurality of support bars 41. The ball screw 51 is supported to be rotatable relative to the fixing table 53 with an axial center thereof extending in the vertical direction, but to be immovable in the axial direction (vertical direction).

A drive gear 54 is mounted on a rotary shaft 52*a* of the motor 52. Further, a driven gear 55 meshed with the drive gear 54 is mounted on an upper end part of the ball screw 51. This causes the rotary shaft 52*a* to rotate together with the drive gear 54 and the ball screw 51 having the driven gear 55 mounted thereon also to rotate when the motor 52 is driven. As a result, the internally threaded member 44 with which the ball screw 51 is threadably engaged is configured to be raised and lowered together with the elevating table 42 as the motor 52 is driven.

A pair of parallel rails 27 are provided to extend in a horizontal direction on the base 26. The movable table 31 on which the first and second pedestals 33, 34 stand is movably placed on the pair of rails 27. The movable table 31 is configured to move in the horizontal direction together with the stator core 10 (including the insertion tool 21 inserted into the stator core 10) placed on the first and second pedestals 33, 34. Specifically, the movable table 31 is configured to be reciprocally movable between a first position where the stator core 10 and the insertion tool 21 are located below the plurality of pushers 43 and a second position where a workspace is present above the stator core 10 and the insertion tool 21. It should be noted that FIG. 9 shows a case where the movable table 31 is located at the second position.

By moving the stator core 10 and the insertion tool 21 to the first position and lowering the elevating table 42 in that state, the narrow parts 43*a* of the plurality of pushers 43 are inserted into the holding grooves 23 as shown in FIG. 2. With the wide parts 43*c* of the pushers 43 inserted in each of the corresponding holding grooves 23 as shown in FIG. 3 by further lowering the elevating table 42, the stator coils 16 having the side parts 16*a*, 16*b* inserted in the holding grooves 23 are pushed outwardly of the insertion tool 21 by the wide parts 43*c*. When being pushed outwardly from the holding grooves 23 in this way, the stator coils 16 move from the holding grooves 23 toward the stator core 10 side and the pairs of side parts 16*a*, 16*b* thereof are respectively inserted into the slots 12 in the stator core 10 facing the holding grooves 23 as shown in FIG. 6. The stator manufacturing apparatus 20 of the present embodiment is configured as just described.

A characteristic configuration of the stator manufacturing apparatus 20 in the present embodiment is to include a pair of shaping tools 61, 62 and shaping tool moving units 63, 64. A pair of shaping tools 61, 62 are provided to face the coil end parts 16*c*, 16*d* of the plurality of stator coils 16 having the pairs of side parts 16*a*, 16*b* inserted in the slots 12. The coil end parts 16*c*, 16*d* projects from the end edges of the stator core 10. The shaping tool moving units 63, 64 shapes the coil end parts 16*c*, 16*d* by pressing the pair of shaping tools 61, 62 in the axial direction against the coil end parts 16*c*, 16*d* with the pushers 43 inserted in the corresponding holding grooves 23.

The shaping tools 61, 62 include a lower shaping tool 61 that shapes the coil end parts 16*d* projecting downward from the stator core 10 whose axial center extends in the vertical direction and an upper shaping tool 62 that shapes the coil end parts 16*c* projecting upward from the stator core 10. Further, the shaping tool moving units 63, 64 include a lower shaping tool moving unit 63 that moves the lower shaping tool 61 and an upper shaping tool moving unit 64 that moves the upper shaping tool 62.

As shown in FIGS. 1 to 4, the lower and upper shaping tools 61, 62 have substantially the same structure and are arranged such that annular walls 61*c*, 62*c* to be described later face each other. Each of the lower and upper shaping tools 61, 62 is in the form of a thick plate and a center hole 61*a*, 62*a* is formed respectively in a central part thereof. Further, a plurality of slits 61*b*, 62*b* radially extending from the center hole 61*a*, 62*a* are formed. The numbers of the slits 61*b*, 62*b* is equal to that of the plurality of pushers 43 so that the plurality of pushers 43 can pass through the lower and upper shaping tools 61, 62.

Further, the lower and upper shaping tools 61, 62 are formed with the annular walls 61*c*, 62*c* that is concentric with the center holes 61*a*, 62*a* and limits the expansion of outer peripheries defined by collections of the coil end parts 16*c*, 16*d* of the plurality of stator coils 16. As shown in FIGS. 2 to 4, parts formed with the plurality of slits 61*b*, 62*b* are formed into a conical shape so that the vicinities of the center holes 61*a*, 62*a* on sides where the annular walls 61*c*, 62 are formed become thick. In this way, the lower and upper shaping tools 61, 62 are configured such that bottom surfaces located inside the annular walls 61*c*, 62*c* come into contact with projecting ends of the coil end parts 16*c*, 16*d*, projecting from the end edges of the stator core 10, of the plurality of stator coils 16 inserted into the slots 12.

The lower shaping tool moving unit 63 has the lower shaping tool 61 mounted on the upper surface thereof. The lower shaping tool moving unit 63 includes a lower elevating plate 63*a* provided on the plurality of support columns 32 movably upward and downward, a pair of ball screws 63*b* threadably engaged with the vicinities of a pair of facing side surfaces of the lower elevating plate 63*a*, and a pair of motors 63*c* rotating the ball screws 63*b*.

Each motor 63*c* is mounted on a lower fixing plate 63*d* fixed to the support columns 32 with a rotary shaft thereof extending vertically upward, and each ball screw 63*b* is mounted on the rotary shaft of the motor 63*c* with an axial center thereof extending in the vertical direction. When the rotary shafts of the pair of motors 63*c* synchronously rotate, the pair of ball screws 63*b* mounted on the rotary shafts also synchronously rotate. In this way, the stator manufacturing apparatus 20 is configured such that the lower elevating plate 63*a* threadably engaged with the pair of ball screws 63*b* is raised and lowered. The lower elevating plate 63*a* is formed in a center thereof with a circular hole 63*e* through which the wide parts 43*c* of the plurality of pushers 43 can pass, and the lower shaping tool 61 is mounted on the lower elevating plate 63*a* coaxially with this circular hole 63*e*.

When the lower elevating plate 63*a* is raised, the lower shaping tool 61 mounted on the upper surface of the lower elevating plate 63*a* is also raised. In this way, with the pushers 43 inserted in each of the corresponding holding grooves 23, the lower shaping tool 61 is pressed in the axial direction against the coil end parts 16*d* projecting downward from the stator core 10 to shape the coil end parts 16*d*.

On the other hand, the upper shaping tool moving unit 64 has the upper shaping tool 62 mounted on the lower surface thereof. The upper shaping tool moving unit 64 includes an upper elevating plate 64*a* provided on the plurality of support bars 41 movably upward and downward, a pair of ball screws 64*b* threadably engaged with the vicinities of a pair of facing side surfaces of the upper elevating plate 64*a*, and a pair of motors 64*c* configured to rotate the ball screws 64*b*.

Each motor 64*c* is mounted on an upper fixing plate 64*d* fixed to the support bars 41 with a rotary shaft thereof extending vertically downward. Each ball screw 64*b* is mounted on the rotary shaft of the motor 64c with an axial center thereof extending in the vertical direction. When the rotary shafts of the pair of motors 64c synchronously rotate, the pair of ball screws 64b mounted on the rotary shafts also synchronously rotate. In this way, the stator manufacturing apparatus 20 is configured such that the upper elevating plate 64a threadably engaged with the pair of ball screws 64b is raised and lowered. The upper elevating plate 64a is formed in a center thereof with a circular hole 64e through which the wide parts 43c of the plurality of pushers 43 can pass, and the upper shaping tool 62 is mounted on the upper elevating plate 64a coaxially with this circular hole 64e.

The upper shaping tool 62 is formed with as many slits 62b as the pushers 43. The slits 62b extends radially from the center hole 62a and faces the plurality of pushers 43, so that the plurality of pushers 43 can pass through. Thus, the upper shaping tool 62 is mounted on the upper elevating plate 64a with lower parts of the pushers 43 inserted in the plurality of slits 62b. In this way, this upper shaping tool 62 functions as a guide member configured to support the lower ends of the plurality of pushers 43 whose upper ends is attached to the internally threaded member 44 and cause each lower end to correspond to each holding groove 23 of the insertion tool 21.

When the upper elevating plate 64a is lowered, the upper shaping tool 62 mounted on the lower surface of the upper elevating plate 64a is also lowered. In this way, with the pushers 43 inserted in each of the corresponding holding grooves 23, the upper shaping tool 62 is pressed in the axial direction against the coil end parts 16c projecting upward from the stator core 10 to shape the coil end parts 16c.

Next, a stator manufacturing method of the present invention using the stator manufacturing apparatus 20 of the present embodiment is described in detail.

The stator manufacturing method of the present embodiment is a method for manufacturing the stator 9 by inserting the pairs of side parts 16a, 16b of the plurality of stator coils 16 wound in advance into the corresponding slots 12 of the stator core 10. In this manufacturing method, the insertion tool 21 formed on the outer periphery with the plurality of slit-like holding grooves 23 in correspondence with the plurality of slots 12 of the stator core 10 is prepared and used.

The stator coils 16 are fabricated in advance by winding the wire materials. The pairs of side parts 16a, 16b of the plurality of these stator coils 16 fabricated in advance are respectively inserted into the corresponding holding grooves 23 of the insertion tool 21. In this way, all the stator coils 16 are arranged along the circumference of the insertion tool 21. It should be noted that FIG. 1 shows a state of inserting only one stator coil 16.

Here, the stator coil 16 is obtained by winding the wire material using an unillustrated commercially available winding machine or the like.

As shown in FIGS. 1 and 7, the stator coil 16 includes the pair of side parts 16a, 16b to be inserted into the slots 12 of the stator core 10 and the pair of coil end parts 16c, 16d coupling the end edges of the side parts 16a, 16b. As described above, the length L3 (see FIG. 7) of the both side parts 16a, 16b is slightly longer than the entire length L1 (see FIG. 1) of the stator core 10.

Further, the length L4 (see FIG. 7) of the coil end parts 16c, 16d is slightly longer than the length between two slots 12 into which the both side parts 16a, 16b are to be inserted. As shown in FIG. 7, the coil end parts 16c, 16d are wound to form a chevron shape.

The plurality of stator coils 16 fabricated in this way are respectively arranged on the outer periphery of the insertion tool 21 and the both side parts 16a, 16b of each stator coil 16 are inserted (disposed) into two holding grooves 23 separated by the predetermined width. To insert the pairs of side parts 16a, 16b of the plurality of stator coils 16 into the plurality of holding grooves 23, the side parts 16a, 16b are pinched by an unillustrated gripping tool and the gripping tool is moved together with the side parts 16a, 16b by an unillustrated actuator, whereby the side parts 16a, 16b of each stator coil 16 can be inserted into the plurality of holding grooves 23.

It should be noted that the stator manufacturing method of the present embodiment may be configured to coat the both side parts 16a, 16b with insulating paper, tape or the like in advance if necessary and insert the insulated both side parts 16a, 16b into the holding grooves 23.

The coating by insulating paper, tape or the like can be performed by a commercially available machine or the like if the stator coil 16 is in a single state. Thus, even in the case of inserting the insulated both side parts 16a, 16b into the holding grooves 23, the arrangement of the stator coil 16 on the outer periphery of the insertion tool 21 can be automated by the stator manufacturing apparatus 20 or the like.

Subsequently, the insertion tool 21 having the plurality of stator coils 16 arranged along the outer periphery is inserted in that state into the inner periphery of the stator core 10. At this time, as shown in FIG. 9, the movable table 31 is moved to the second position where the workspace is present above the first and second pedestals 33, 34. After the stator core 10 is placed on the first pedestal 33, the insertion tool 21 is inserted into the inner periphery of the stator core 10 and placed on the second pedestal 34, thereby maintaining a state where the insertion tool 21 is inserted in the inner periphery of the stator core 10 as shown in FIG. 2.

Here, the first pedestal 33 is configured to support the periphery of the lower surface of the stator core 10 and the second pedestal 34 is configured to support the central part of the insertion tool 21 excluding the holding grooves 23 from below. Thus, when the insertion tool 21 is inserted into the inner periphery of the stator core 10, the coil end parts 16d of the stator coils 16 projecting downward from the stator core 10 are inserted through the circular hole 33a of the first pedestal 33 to project into a space formed outside the second pedestal 34.

Subsequently, as shown in FIG. 3, the both side parts 16a, 16b of the stator coils 16 held in the holding grooves 23 of the insertion tool 21 are pushed out toward the radially outer side and inserted into the corresponding slots 12 of the stator core 10, using the aforementioned pressing tool 40.

Specifically, the motor 52 is driven to raise the elevating table 42 threadably engaged with the ball screw 51 together with the plurality of pushers 43, so that the pushers 43 do not interfere with the stator core 10 when the first and second pedestals 33, 34 are moved. Then, the movable table 31 is moved, together with the stator core 10 and the insertion tool 21 placed on the first and second pedestals 33, 34, in the horizontal direction to the first position where the stator core 10 and the insertion tool 21 are located below the plurality of pushers 43.

Subsequently, the upper elevating plate 64a is lowered together with the upper shaping tool 62, thereby bringing the upper shaping tool 62 closer to the insertion tool 21. The narrow parts 43a of the plurality of pushers 43 inserted into the radial slits 62b formed in the upper shaping tool 62 are respectively positioned to correspond to the holding grooves 23 of the insertion tool 21. Thereafter, the motor 52 is driven again to lower the elevating table 42, whereby the plurality of pushers 43 provided on the elevating table 42 are inserted into the holding grooves 23 with the narrow parts 43*a* thereof in the lead.

As shown in FIG. 2, the narrow parts 43*a* of the pushers 43 are first inserted into the holding grooves 23 and, thereafter the tapered parts 43*b* are inserted thereinto. In this way, the tapered parts 43*b* push the both side parts 16*a* 16*b* of the stator coils 16 inserted in the holding grooves 23 radially outwardly of the insertion tool 21. Specifically, the both side parts 16*a*, 16*b* inserted in the holding grooves 23 are pushed toward the radially outer side by the tapered parts 43*b* of the pushers 43 and, thereafter the wide parts 43*c* are inserted, whereby the side parts 16*a*, 16*b* are completely inserted into the slots 12 of the stator core 10. FIGS. 3 and 6 show a state where the both side parts 16*a*, 16*b* of the stator coils 16 are completely inserted in the corresponding slots 12.

Here, the both side parts 16*a*, 16*b* of the stator coils 16 held by the insertion tool 21 are pushed out toward the radially outer side and inserted into each of the slots 12. Thus, the spacing L4 (see (a) of FIG. 7) between the both side parts 16*a*, 16*b* of the stator coils 16 held by the insertion tool 21 is expanded to a spacing L4' (see (b) of FIG. 7) with the both side parts 16*a*, 16*b* inserted in each of the slots 12 as shown in FIG. 6. As just described, in the stator manufacturing apparatus 20 of the present embodiment, the stator coils 16 are suitably expanded in the circumferential direction and inserted into the slots 12 of the stator core 10.

Figure 10:
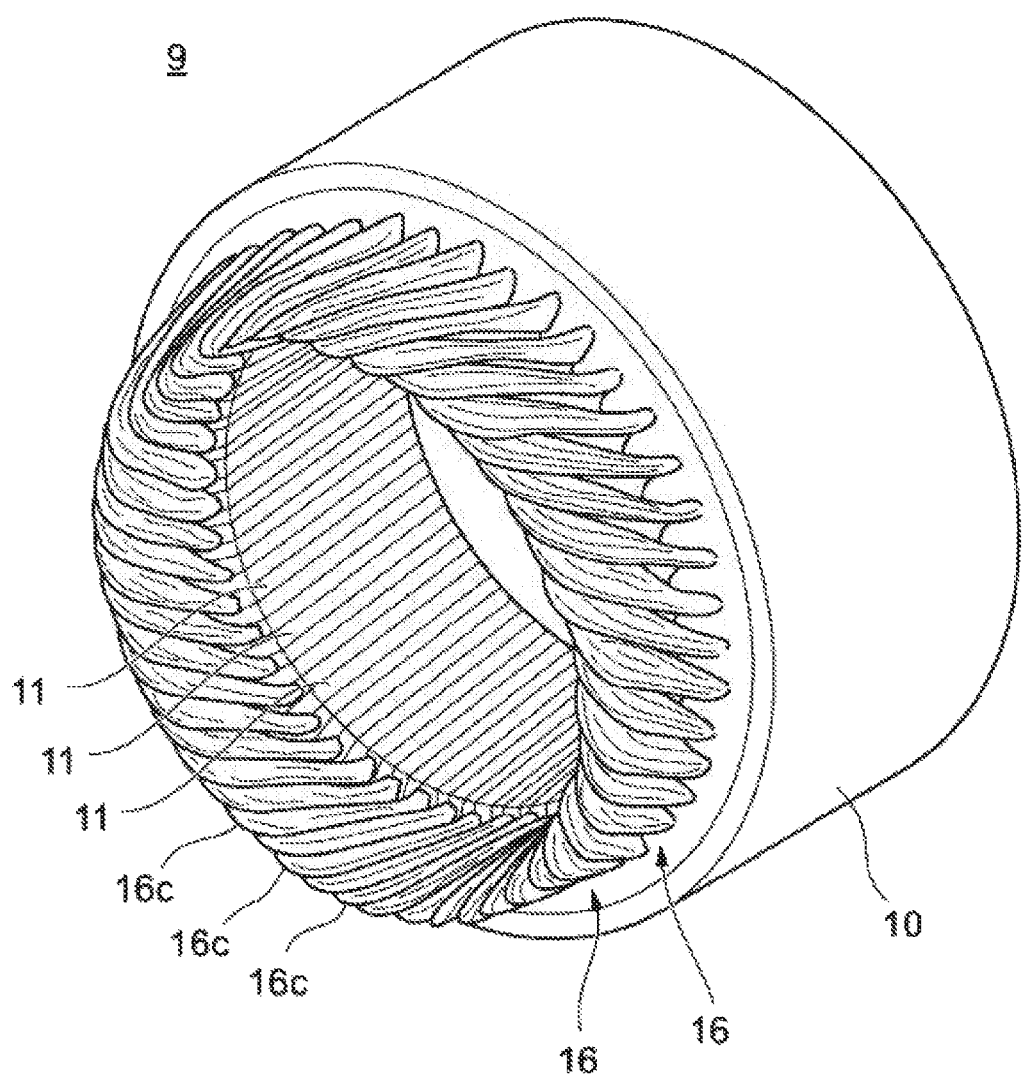
FIG. 10 is a perspective view of a stator when the stator coils are inserted into the slot of the stator core.

As described above, each of the coil end parts 16*c*, 16*d* of the stator coils 16 connecting the end edges of the both side parts 16*a*, 16*b* are formed into a chevron shape. Thus, each of the coil end parts 16*c*, 16*d*, projecting from the end edges of the stator core 10, of the plurality of stator coils 16 having the pairs of side parts 16*a*, 16*b* inserted in the slots 12 forms a chevron shape and projects from the end surface of the stator core 10 as shown in FIG. 10.

Thus, the stator manufacturing method of the present embodiment further includes a step of subsequently shaping the coil end parts 16*c*, 16*d*. Specifically, with the pushers 43 inserted in each of the corresponding holding grooves 23, the shaping tools 61, 62 are respectively pressed in the axial direction against the coil end parts 16*c*, 16*d*, projecting from the end edges of the stator core 10, of the plurality of stator coils 16 having the pairs of side parts 16*a*, 16*b* inserted in the slots 12. In this way, the coil end parts 16*c*, 16*d* are shaped. The coil end parts 16*c*, 16*d* are shaped by pressing the lower and upper shaping tools 61, 62 against the coil end parts 16*c*, 16*d* by the lower and upper shaping tool moving units 63, 64.

Specifically, in the lower shaping tool moving unit 63, the motors 63*c* are driven to synchronously rotate the ball screws 63*b* to raise the lower elevating plate 63*a* threadably engaged with the ball screws 63*b*, thereby raising the lower shaping tool 61 mounted on the upper surface of the lower elevating plate 63*a*. With the pushers 43 inserted in each of the corresponding holding grooves 23, the lower shaping tool moving unit 63 shapes the coil end parts 16*d* by pressing the lower shaping tool 61 in the axial direction against the coil end parts 16*d* projecting downward from the stator core 10.

On the other hand, in the upper shaping tool moving unit 64, the motors 64*c* are driven to synchronously rotate the ball screws 64*b* to lower the upper elevating plate 64*a* threadably engaged with the ball screws 64*b*, thereby lowering the upper shaping tool 62 mounted on the lower surface of the upper elevating plate 64*a*. With the pushers 43 inserted in each of the corresponding holding grooves 23, the upper shaping tool moving unit 64 shapes the coil end parts 16*c* by pressing the upper shaping tool 62 in the axial direction against the coil end parts 16*c* projecting upward from the stator core 10.

Figure 11:
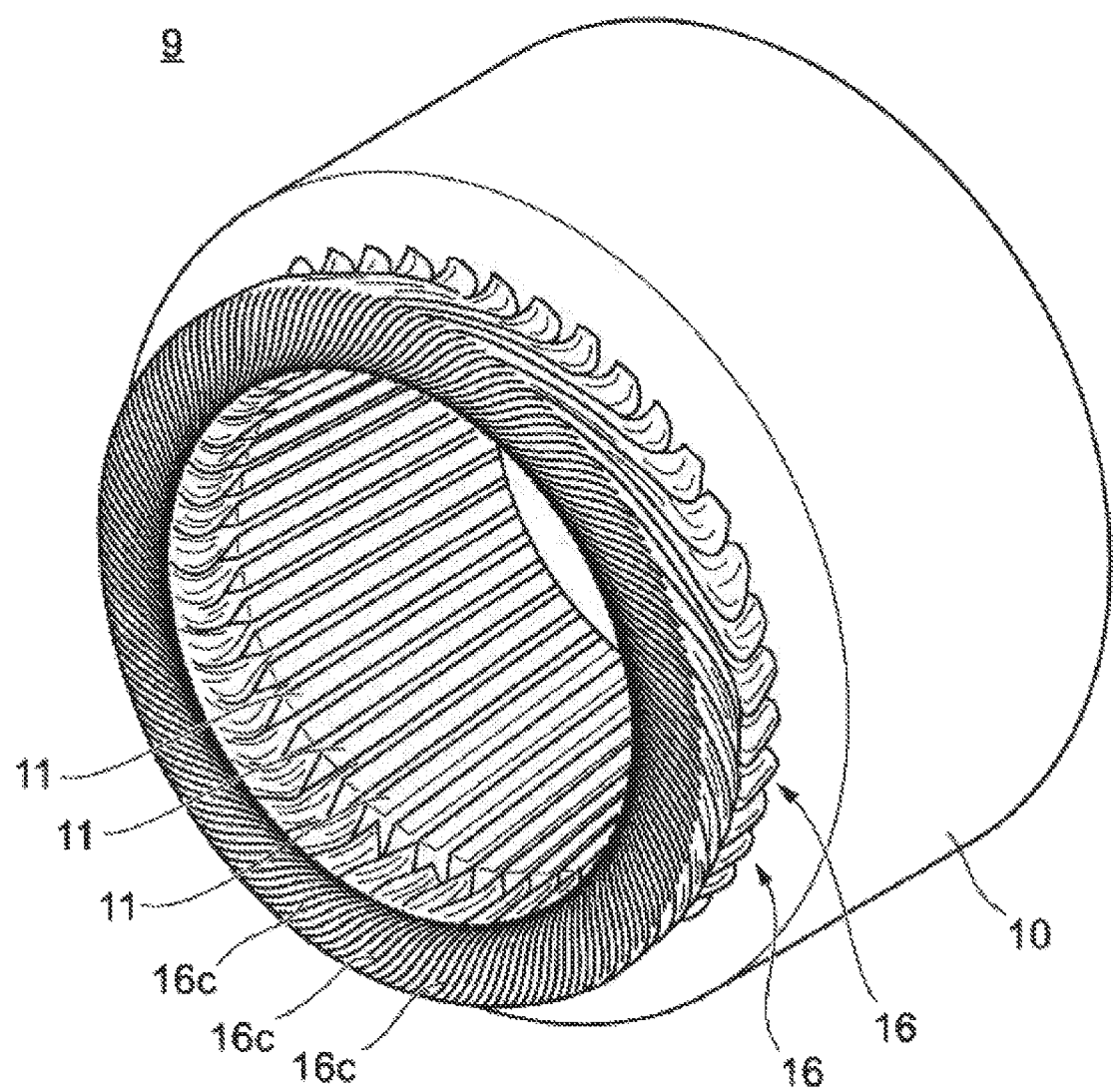
FIG. 11 is a perspective view of the stator, corresponding to FIG. 10, when the coil end parts of the stator coils are shaped.

When the coil end parts 16*c*, 16*d* are shaped by pressing the lower and upper shaping tools 61, 62 in the axial direction against the coil end parts 16*c*, 16*d* projecting from the both end surfaces of the stator core 10 in this way, the heights of the coil end parts 16*c*, 16*d* projecting from the end surfaces of the stator core 10 become smaller than those before shaping as shown in FIG. 11. Thus, according to the stator manufacturing method of the present embodiment, the stator 9 can be obtained, which can make the heights of the coil end parts 16*c*, 16*d* projecting from the both end surfaces of the stator core 10 relatively small and has a uniform height over the entire circumference.

Here, the coil end parts 16*c*, 16*d* are shaped with the pushers 43 inserted in each of the corresponding holding grooves 23. Thus, even if the coil end parts 16*c*, 16*d* are shaped by pressing the lower and upper shaping tools 61, 62, the separation of the side parts 16*a*, 16*b* connected to the squeezed coil end parts 16*c*, 16*d* from each of the slots 12 can be effectively prevented by the presence of the pushers 43. Therefore, according to the stator manufacturing method of the present embodiment, it is possible to reduce the heights of the coil end parts 16*c*, 16*d* projecting from the end edges of the stator core 10 while preventing the separation of the side parts 16*a*, 16*b* of the stator coils 16 from the slots 12.

When the lower and upper shaping tools 61, 62 are separated from the coil end parts 16*c*, 16*d* after the coil end parts 16*c*, 16*d* are shaped by pressing the lower and upper shaping tools 61, 62 in this way, forces for projecting from the end edges of the stator core 10 are generated in the coil end parts 16*c*, 16*d* due to springback.

On the other hand, before the coil end parts 16*c*, 16*d* are shaped, forces for moving in the radially inward direction from the slots 12 and popping out are generated in parts or entireties of the pairs of side parts 16*a*, 16*d* inserted in the slots 12 by restoring forces for returning to initial shapes due to so-called springback.

However, when the lower and upper shaping tools 61, 62 are separated from the coil end parts 16*c*, 16*d* after the coil end parts 16*c*, 16*d* are shaped, the forces of the pairs of side parts 16*a*, 16*b* for popping out of the slots 12 are transformed into forces for moving toward the radially outer side of the stator core 10 to be accommodated into the slots 12 due to the forces for projecting from the end edges of the stator core 10 generated in the coil end parts 16*c*, 16*d*.

Thus, even if the pushers 43 are removed from the holding grooves 23 after the shaping of the coil end parts 16*c*, 16*d*, there is no possibility that a part or all of the pairs of side parts 16*a*, 16*b* inserted in the slots 12 move in the radially inward direction and pop out of the slots 12 due to so-called springback.

Thus, according to the stator manufacturing method and the stator manufacturing apparatus 20 of the present invention, it is possible to reduce the heights of the coil end parts 16*c*, 16*d* projecting from the end edges of the stator core 10 while preventing the side parts 16*a*, 16*b* of the stator coils 16 inserted into the slots 12 from popping out of the slots 12.

After the coil end parts 16*c*, 16*d* are shaped, by separating the lower and upper shaping tools 61, 62 from the stator core 10, removing the pushers 43 from the holding grooves 23, and pulling the insertion tool 21 out from the inner periphery of the stator core 10, the stator 9 can be obtained in which the stator coils 16 are assembled in the slots 12 of the stator core 10.

In the stator 9 thus obtained, the coil end parts 16*c*, 16*d* are compact and uniformly projecting as shown in FIG. 11. Thus, the stator 9 itself and a motor produced using this stator 9 can be made compact.

It should be noted that, in the above embodiment, the shaping tools 61, 62 are pressed in the axial direction against the coil end parts 16*c*, 16*d*, projecting from the end edges of the stator core 10, of the plurality of stator coils 16 after the pushers 43 are inserted into each of the corresponding holding grooves 23 and the pairs of side parts 16*a*, 16*b* are inserted into the slots 12.

However, in the case of using the lower and upper shaping tools 61, 62 in which the parts formed with the plurality of slits 61*b*, 62*b* are formed into a conical shape as shown in FIGS. 2 to 4, the pairs of side parts 16*a*, 16*b* can also be inserted into the slots 12 by inserting the pushers 43 into each of the corresponding holding grooves 23 while the shaping tools 61, 62 are pressed against the coil end parts 16*c*, 16*d*. Specifically, in the stator manufacturing method of the present embodiment, a step of inserting the plurality of pushers 43 into the plurality of holding grooves 23 of the insertion tool 21 may be performed simultaneously with a step of shaping the coil end parts 16*c*, 16*d* of the stator coils 16 by the lower and upper shaping tools 61, 62.

If the lower and upper shaping tools 61, 62 are brought into contact with the coil end parts 16*c*, 16*d* before the pairs of side parts 16*a*, 16*b* are inserted into the slots 12, the coil end parts 16*c*, 16*d* contact the parts of the lower and upper shaping tools 61, 62 where the plurality of slits 61*b*, 62*b* are formed. If the parts formed with the slits 61*b*, 62*b* have a conical shape, the coil end parts 16*c*, 16*d* contacting those parts are guided in the radially outward direction by the inclination of those parts, whereby the entire stator coils 16 can be quickly pushed and expanded in the radially outward direction.

Further, in the case of inserting the pairs of side parts 16*a*, 16*b* into the slots 12 by the pushers 43 while the lower and upper shaping tools 61, 62 are pressed against the coil end parts 16*c*, 16*d*, it is also possible to prevent the stator coils 16 from returning axially inwardly of the stator core 10 by axial movements of the pushers 43 guiding the pairs of side parts 16*a*, 16*b* in the radially outward direction.

On the other hand, in the case of pressing the lower and upper shaping tools 61, 62 in the axial direction against the coil end parts 16*c*, 16*d*, projecting from the end edges of the stator core 10, of the plurality of stator coils 16 after the pushers 43 are inserted into each of the corresponding holding grooves 23 to insert the pairs of side parts 16*a*, 16*b* into the slots 12, the parts formed with the plurality of slits 61*b*, 62*b* need not be formed into a conical shape.

Figure 12:
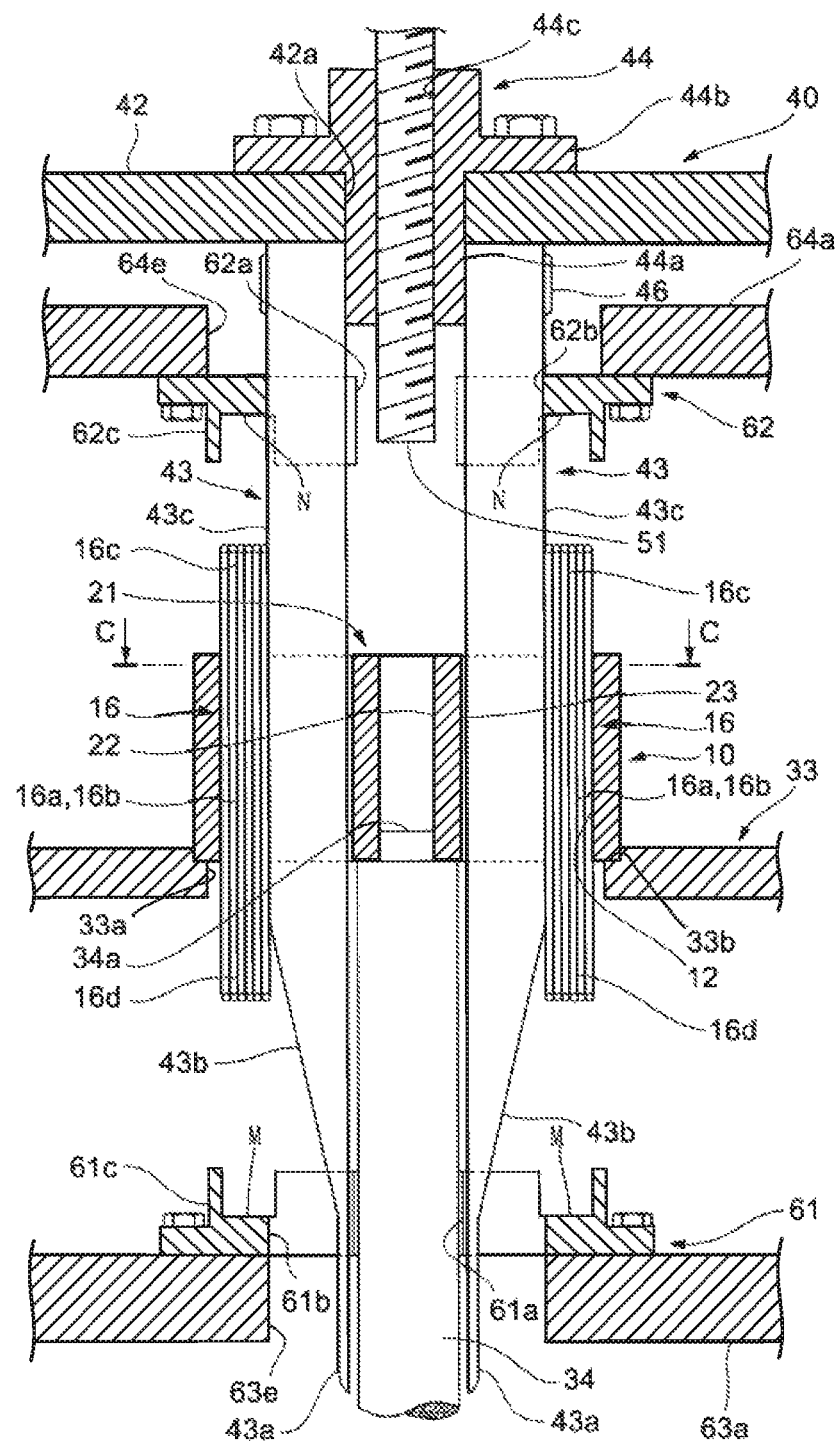
FIG. 12 is a sectional view corresponding to FIG. 3, showing a state where other shaping tools are separated before shaping the coil end parts.
Figure 13:
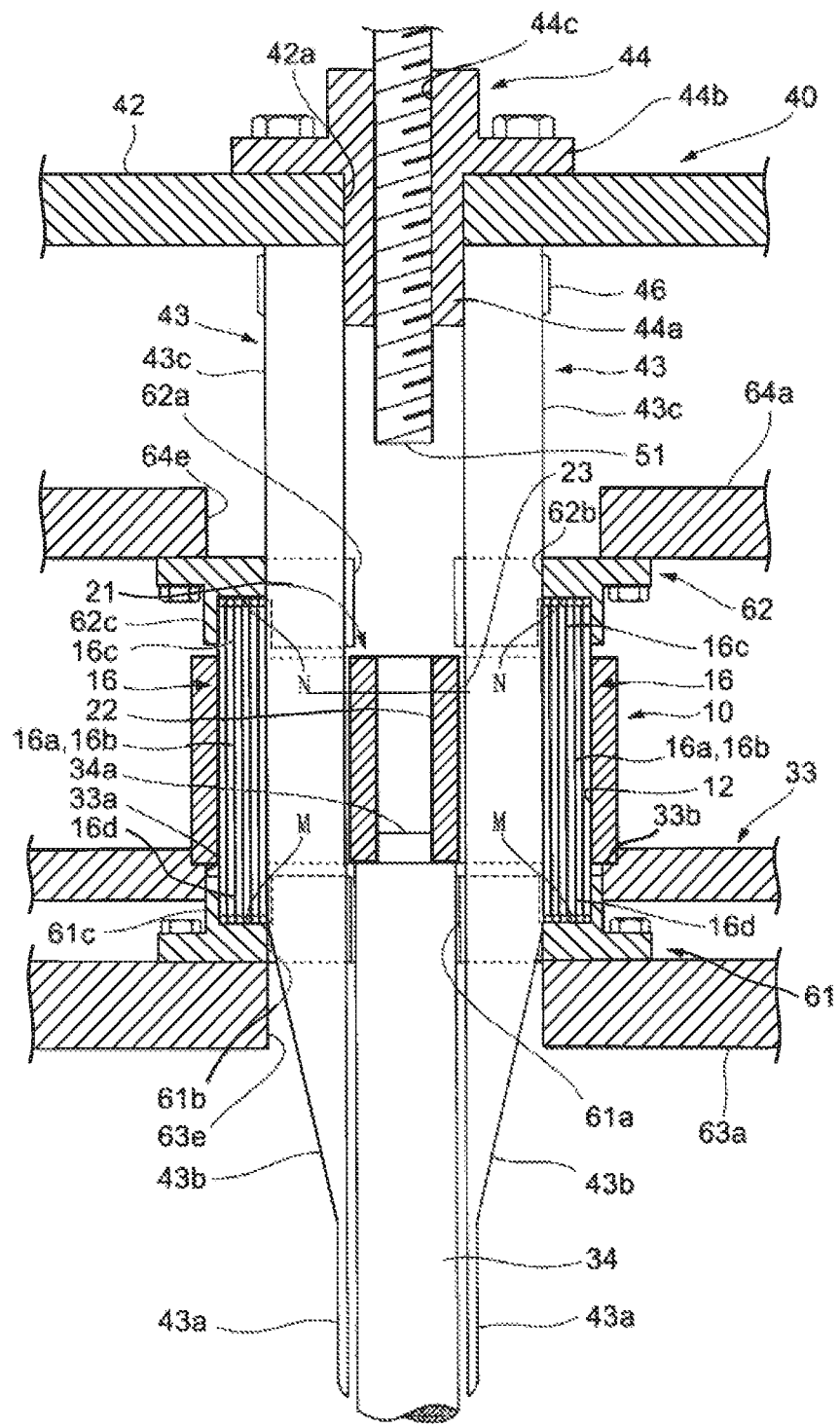
FIG. 13 is a sectional view corresponding to FIG. 4, showing a state where other shaping tools are pressed against the coil end parts for shaping.

For example, even if slits 61*b*, 62*b* are radially formed from center holes 61*a*, 62*a* in lower and upper shaping tools 61, 62 formed into a relatively thick plate shape as shown in FIGS. 12 and 13, those parts may remain to be thick. In this way, parts for shaping the coil end parts 16*c*, 16*d* of the stator coils 16 having the pairs of side parts 16*a*, 16*b* inserted in the slots 12 may be formed as peripheral grooves M, N.

If such lower and upper shaping tools 61, 62 are pressed in the axial direction against the coil end parts 16*c*, 16*d*, the coil end parts 16*c*, 16*d* at the end edges of the stator core 10 can be reliably shaped in ranges of the peripheral grooves M, N as compared to the lower and upper shaping tools 61, 62 in which the parts formed with the plurality of slits 61*b*, 62*b* are formed into a conical shape. Further, since the coil end parts 16*c*, 16*d* can also be shaped by being expanded toward an outer peripheral side, a post-step of inserting an unillustrated rotor or the like into the inner periphery of the stator core 10 can be expected to be smoothly performed.

The embodiments of the present invention described above are merely illustration of some application examples of the present invention and not of the nature to limit the technical scope of the present invention to the specific constructions of the above embodiments.

In the above embodiment, the ball screw 51 is driven by the motor 52 as the elevation means for the elevating table 42. However, the present invention is not limited to such a configuration. For example, without being limited to a combination of the ball screw 51 and the motor 52, this elevation means may use a hydraulic or pneumatic pressure or a combination of these pressures.

The present application claims a priority based on Japanese Patent Application No. 2015-39903 filed with the Japan Patent Office on Mar. 2, 2015, all the contents of which are hereby incorporated by reference.

The invention claimed is:

1. A stator manufacturing apparatus, comprising:
   an insertion tool configured to be insertable into a stator core, the insertion tool having a plurality of slit-like holding grooves formed on an outer periphery in correspondence with a plurality of slots of the stator core, the insertion tool being configured to dispose a pair of side parts of a stator coil in two of the holding grooves separated by a predetermined width;
   a pressing tool including a plurality of plate-like pushers narrowed in width toward tips and arranged to correspond to the positions of the plurality of holding grooves of the insertion tool, the pressing tool being configured to push out the side parts of the stator coils toward a radially outer side and insert the side parts into the corresponding slots by inserting the pushers into each of the corresponding holding grooves with the tips in the lead in a state where the stator coils are disposed on the insertion tool;
   a pair of shaping tools provided to face coil end parts of a plurality of the stator coils having the pairs of side parts inserted in the plurality of slots, the coil end parts projecting from end edges of the stator core, a plurality of slits through which the pushers are insertable being provided in a principal surface of each shaping tool; and
   a shaping tool moving unit configured to shape the coil end parts by pressing the pair of shaping tools in an axial direction with the pushers inserted in each of the corresponding holding grooves.

2. The stator manufacturing apparatus according to claim 1, further comprising:
   an elevation unit configured to raise and lower the pressing tool with respect to the insertion tool.

3. The stator manufacturing apparatus according to claim 1, wherein:
   the pressing tool is pressed against the insertion tool by the elevation unit at the same time as the shaping tools are pressed against the coil end parts by the shaping tool moving unit.

4. The stator manufacturing apparatus according to claim 1, wherein:
   central parts of the pair of shaping tools facing the coil end parts are formed into a conical shape and an annular wall configured to limit the expansion of the coil end parts toward an outer periphery is provided on a surface of each of the shaping tools facing the coil end parts.

5. A stator manufacturing method for manufacturing a stator by inserting pairs of side parts of a plurality of stator coils wound in advance into corresponding slots of a stator core, comprising:

preparing an insertion tool having a plurality of slit-like holding grooves formed on an outer periphery in correspondence with a plurality of the slots of the stator core;

disposing the pair of side parts of each of the plurality of stator coils wound in advance into two of the holding grooves separated by a predetermined width;

positioning the insertion tool such that the holding grooves are aligned with the corresponding slots of the stator core by inserting the insertion tool into an inner periphery of the stator core;

arranging a pair of shaping tools to face coil end parts of the stator coils projecting from end edges of the insertion tool, a plurality of slits being provided in a principal surface of each of the shaping tools;

pushing out the side parts of the stator coils toward a radially outer side and inserting the side parts into the corresponding slots of the stator core by inserting a plurality of plate-like pushers narrowed in width toward tips into the plurality of corresponding holding grooves via the slits of the shaping tools with the tips in the lead; and shaping the coil end parts by pressing the pair of shaping tools in an axial direction against the coil end parts of the plurality of stator coils projecting from end edges of the stator core with the plurality of pushers inserted in the corresponding holding grooves.

6. The stator manufacturing method according to claim 5, wherein:

the insertion of the pushers is performed simultaneously with the shaping of the coil end parts.

* * * * *